United States Patent
Andersson et al.

(10) Patent No.: US 11,128,664 B1
(45) Date of Patent: Sep. 21, 2021

(54) INTRUSION PREVENTION SYSTEM WITH MACHINE LEARNING MODEL FOR REAL-TIME INSPECTION OF NETWORK TRAFFIC

(71) Applicant: Trend Micro Incorporated, Tokyo (JP)

(72) Inventors: Jonathan Andersson, Round Rock, TX (US); Josiah Hagen, Round Rock, TX (US); Brandon Niemczyk, Austin, TX (US)

(73) Assignee: Trend Micro Incorporated, Tokyo (JP)

( * ) Notice: Subject to any disclaimer, the term of this patent is extended or adjusted under 35 U.S.C. 154(b) by 728 days.

(21) Appl. No.: 15/490,609

(22) Filed: Apr. 18, 2017

Related U.S. Application Data

(60) Provisional application No. 62/431,700, filed on Dec. 8, 2016.

(51) Int. Cl.
  *H04L 9/00* (2006.01)
  *H04L 29/06* (2006.01)
  *H04L 29/08* (2006.01)
  *G06N 20/00* (2019.01)

(52) U.S. Cl.
  CPC ............ *H04L 63/20* (2013.01); *G06N 20/00* (2019.01); *H04L 63/1416* (2013.01); *H04L 63/1441* (2013.01); *H04L 67/02* (2013.01)

(58) Field of Classification Search
  USPC .......................................................... 726/1
  See application file for complete search history.

(56) References Cited

U.S. PATENT DOCUMENTS

| | | | | |
|---|---|---|---|---|
| 7,114,185 | B2* | 9/2006 | Moore | G06F 21/563 726/22 |
| 8,271,503 | B2* | 9/2012 | Glaenzer | G06F 17/2211 707/749 |
| 9,294,487 | B2* | 3/2016 | Curnyn | G06F 21/566 |
| 2008/0077793 | A1* | 3/2008 | Tan | G06F 21/56 713/168 |
| 2010/0077482 | A1* | 3/2010 | Adams | G06F 21/564 726/24 |
| 2014/0189864 | A1* | 7/2014 | Wang | G06F 21/51 726/23 |
| 2017/0264626 | A1* | 9/2017 | Xu | H04L 63/1425 |
| 2018/0139141 | A1* | 5/2018 | Stepanek | H04L 47/2441 |

OTHER PUBLICATIONS

Jonathan Andersson, et al."Using Maching Learning to Stop Exploit Kits In-Line in Real-Time: Statistical Models Identify Obfuscated HTML", Oct. 2016, pp. 1-6, Virus Bulletin Conference.

* cited by examiner

*Primary Examiner* — Christopher J Brown
(74) *Attorney, Agent, or Firm* — Patrick D. Benedicto

(57) ABSTRACT

An intrusion prevention system includes a machine learning model for inspecting network traffic. The intrusion prevention system receives and scans the network traffic for data that match an anchor pattern. A data stream that follows the data that match the anchor pattern is extracted from the network traffic. Model features of the machine learning model are identified in the data stream. The intrusion prevention system classifies the network traffic based at least on model coefficients of the machine learning model that are identified in the data stream. The intrusion prevention system apples a network policy on the network traffic (e.g., block the network traffic) when the network traffic is classified as malicious.

20 Claims, 4 Drawing Sheets

INTRUSION PREVENTION SYSTEM WITH MACHINE LEARNING MODEL FOR REAL-TIME INSPECTION OF NETWORK TRAFFIC

REFERENCE TO RELATED APPLICATION

This application claims the benefit of U.S. Provisional Application No. 62/431,700, filed on Dec. 8, 2016, which is incorporated herein by reference in its entirety.

BACKGROUND OF THE INVENTION

1. Field of the Invention

The present invention relates generally to computer security, and more particularly but not exclusively to methods and systems for inspecting computer network traffic.

2. Description of the Background Art

Intrusion prevention systems operate as a bump in the wire that enforces network and security policy. This is markedly different from intrusion detection systems, which monitor network traffic often through log data. That is, an intrusion detection system operates on past data, whereas an intrusion prevention system typically operates in real-time. More particularly, an intrusion prevention system can protect network segments during an attack because it operates on current data. As part of a multi-layered system of defenses, intrusion prevention systems often form the outermost layer and first line of defense.

A network security device, such an intrusion prevention or detection system, may employ different approaches to inspect network traffic for malicious data. For example, a network security device may employ pattern matching to inspect network traffic. As another example, some intrusion detection systems perform network traffic inspection using machine learning techniques. However, machine learning is heretofore not practicable for use by intrusion prevention systems because of the requirement to inspect high volumes of network traffic in real-time.

SUMMARY

In one embodiment, an intrusion prevention system includes a machine learning model for inspecting network traffic. The intrusion prevention system receives and scans the network traffic for data that match an anchor pattern. A data stream that follows the data that match the anchor pattern is extracted from the network traffic. Model features of the machine learning model are identified in the data stream. The intrusion prevention system classifies the network traffic based at least on model coefficients of the machine learning model that are identified in the data stream. The intrusion prevention system may apply a network policy on the network traffic (e.g., block the network traffic) when the network traffic is classified as malicious.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

An intrusion prevention system is often deployed at the perimeter of a network or network segment, in-line with network traffic. Network traffic passes through the intrusion prevention system before proceeding further into the network. Accordingly, and to avoid or minimize latency, an intrusion prevention system is expected to operate as a real-time system. Even deep packet inspection must proceed quickly in order not to impede the flow of packets. Further complicating the speed requirement is the fact that an intrusion prevention system needs to track the network traffic and payloads for many (in the millions) different sessions or flows simultaneously.

An example commercially-available intrusion prevention system is the 7500NX intrusion prevention system from TREND MICRO TIPPINGPOINT. The 7500NX intrusion prevention system supports network traffic at 20 Gb/s, can handle 60,000,000 concurrent flows, and has less than 40 microseconds of latency per packet. The aforementioned data rates limit the amount of time that an intrusion prevention has to identify malicious traffic. Performant intrusion prevention systems seek to avoid methods of inspection that impede network flow.

In general, intrusion prevention systems can match Internet Protocol (IP) addresses, host names, and Uniform Resource Locators (URLs) to known whitelists and block lists. Additionally, intrusion prevention systems can match byte sequences or strings within packet payloads to known malicious patterns. This matching can include application of regular expressions in order to match patterns more loosely. An intrusion prevention system performs all of these operations with minimal state in a single pass over the traffic, in order to guarantee desired data rate and latency performance. As will be more apparent below, embodiments of the present invention may be incorporated into suitable new or pre-existing intrusion prevention systems so as to be able to use machine learning technology to quickly and effectively inspect network traffic.

Figure 1:
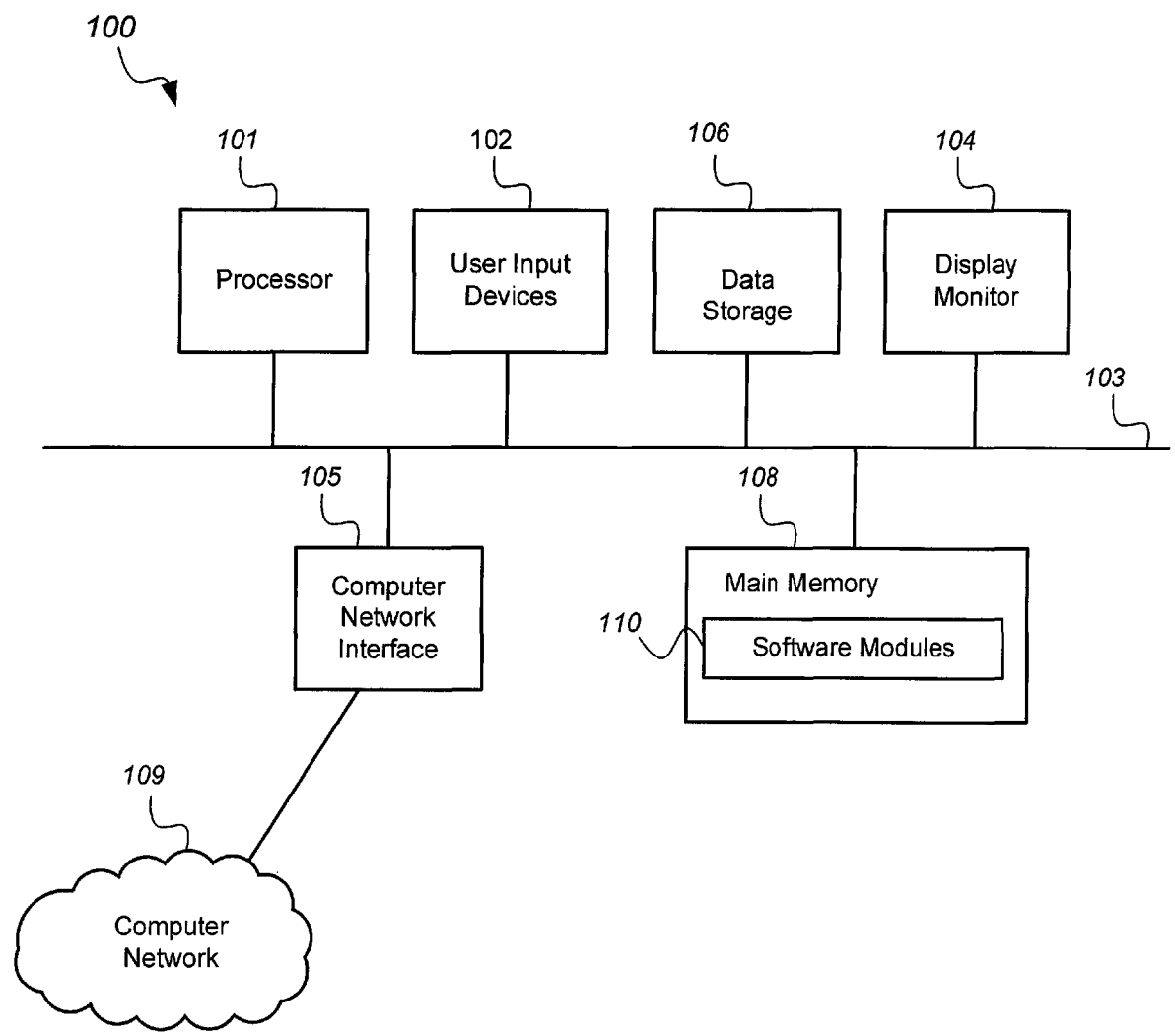
FIG. 1 shows a logical diagram of a computer system in accordance with an embodiment of the present invention.

Referring now to FIG. 1, there is shown a logical diagram of a computer system 100 in accordance with embodiments of the present invention. Depending on its configuration, the computer system 100 may be employed as an intrusion prevention system for inspecting network traffic or as a backend system for generating a machine learning model for use by the intrusion prevention system. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, flash memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules 110, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules 110.

As can be appreciated, the functionality of the computer system 100 may be implemented in hardware or combination of hardware and software. For example, in some embodiments, the computer system 100 may include field programmable gate array (FPGA) chip, application specific integrated circuit (ASIC), or other hardware logic to perform the functions of the one or more software modules 110.

Figure 2:
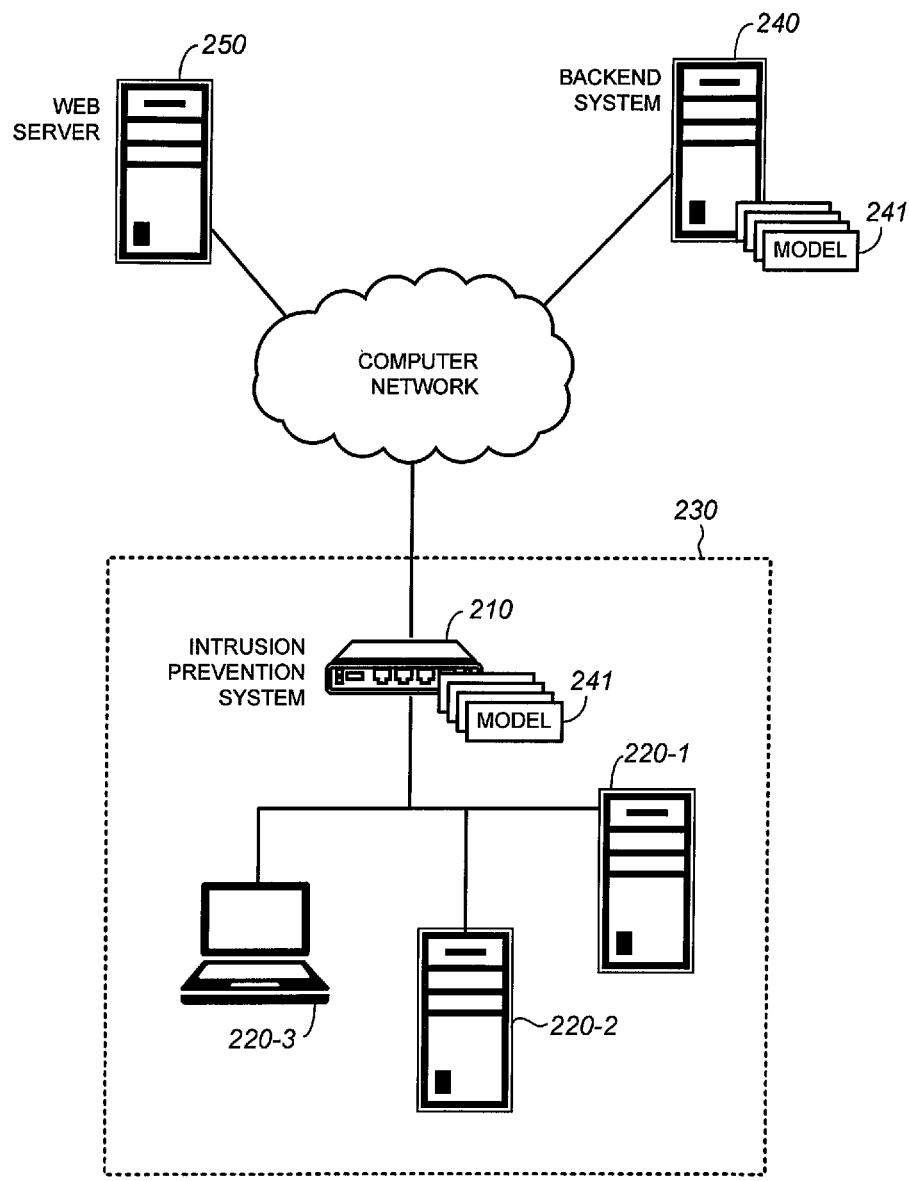
FIG. 2 shows a logical diagram of a computer network (or network segment) protected by an intrusion prevention system in accordance with an embodiment of the present invention.

FIG. 2 shows a logical diagram of a computer network (or network segment) 230 in accordance with an embodiment of the present invention. In the example of FIG. 2, the perimeter of the computer network 230 is defended against malicious traffic by an intrusion prevention system (IPS) 210. The computer network 230 may include a plurality of network devices 220 (i.e., 220-1, 220-2, etc.), such as end user computers, servers, routers, etc. In one embodiment, the IPS 210 inspects all network traffic going into or out of the computer network 230. For example, the IPS 210 may inspect packets communicated between an end user computer 220-3 of the computer network 230 and a web server 250 on the Internet.

In one embodiment, the IPS 210 is configured to inspect network traffic in real-time using a machine learning model 241. The machine learning model 241 may be generated in a backend system 240 and transmitted to the IPS 210 over a computer network, which may include the Internet. The backend system 240 may be maintained and operated by antivirus researchers, such as personnel of Trend Micro, Inc.

The IPS 210 may be configured to inspect network traffic to look for various malware, including those created using exploit kits. Exploit kits provide attackers with dynamic threat platforms. Exploit kits are pre-engineered, commoditized software systems that allow attackers to deploy malicious payloads to target machines. Exploit kits are stealthy and designed to evade security measures. They work in conjunction with a landing page to perform a drive-by-download or malvertising. Generally speaking, once a web browser of a computer encounters an exploit kit landing page, the exploit kit scans the computer to detect vulnerabilities in the web browser or in software loaded by the web browser (e.g., JAVA or FLASH plug-in), exploits vulnerabilities it discovers, and thereafter executes malicious code.

As its name implies, the machine learning model 241 may be generated by machine learning. Generally speaking, machine learning, also known as "data science", is a set of computational techniques for analyzing data. Statistics taken from the data, which are called "features", are used to associate one datum with another. When dealing with known, i.e., labelled data, machine learning allows for generation of models that can classify new data according to these labels. With a corpus of benign and malicious samples, a machine learning model 241 that can classify network traffic as being benign or malicious may be generated.

Machine learning classification may involve two phases: a training phase and an application phase. The training phase, where the machine learning model 241 is created, may be performed offline from the IPS 210. In one embodiment, the training phase is performed in the backend system 240. The training phase may involve training using labeled data, which in this example comprise malicious data and benign data. Cross-validation on the labeled data may be done to determine classifier accuracy on a segment of the data held out from training. The application phase involves using the generated machine learning model 241 on new data, which in this example comprises network traffic, in order to determine the labels, i.e., classification, of the new data. The application phase is performed in the IPS 210.

Figure 3:
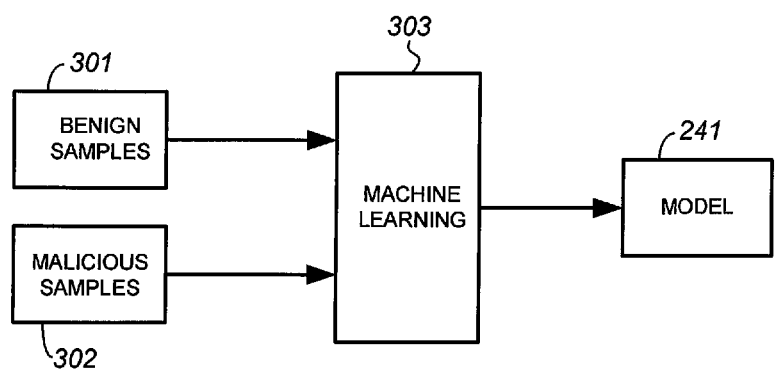
FIG. 3 graphically illustrates a training phase for generating a machine learning model in accordance with an embodiment of the present invention.

FIG. 3 graphically illustrates a training phase for generating the machine learning model 241 in accordance with an embodiment of the present invention. The training phase for generating the machine learning model 241 may be performed in the backend system 240. As can be appreciated, one or more machine learning models 241 may be generated to address different malware or malware techniques. For example, a machine learning model 241 may be generated for each obfuscation technique. A single machine learning model 241 is generated in the example of FIG. 3 for clarity of illustration.

In the example of FIG. 3, the training data set for the training phase comprise benign samples 301 and malicious samples 302. The benign samples 301 comprise samples of benign data and the malicious samples 302 comprise samples of malicious data. As a particular example, for a machine learning model 241 that is trained to detect malware of a particular exploit kit that works in conjunction with a web page (e.g., the ANGLER exploit kit), the benign samples 301 may comprise samples of known benign web pages of legitimate websites and the malicious samples 302 may comprise samples of web pages that are known to be landing pages of the exploit kit. As can be appreciated, the benign samples 301 and malicious samples 302 are selected based on the malware to be detected by the machine learning model 241.

The machine learning module 303 receives the benign samples 301 and the malicious samples 302 to generate the machine learning model 241. In one embodiment, machine learning module 303 builds a linear machine learning model 241 by training with the benign samples 301 and the malicious samples 302. Other machine learning models may also be used without detracting from the merits of the present invention.

In general, any suitable machine learning algorithm for building a linear model may be employed without detracting from the merits of the present invention. The machine learning model 241 may be represented as, $$C0+C1x1+C2x2+C3x3, \text{etc.}$$

where C0, C1, C3, etc. represent model coefficients and x1, x2, x3, etc. represent model features. By training with the benign samples 301 and the malicious samples 302, the values of the model coefficients for corresponding model features may be found. The model coefficients serve as weights that may be summed when the corresponding model features are present. More particularly, for a particular collected data stream, the weights of features that are present in the collected data stream may be added together to generate a sum, which may be compared to a bias in order to classify the collected data stream as either malicious or benign.

In one embodiment, the features of the machine learning model 241 (i.e., model features) are identified from a fixed-length data stream that immediately follows or an offset from the data that match an anchor pattern. In general, the data described by the anchor pattern serve as a sign post on when to start collecting a fixed-length data stream that may contain features indicative of malware. The data described by the anchor pattern may be identified by antivirus researchers from samples of known malicious data, such as from the malicious samples 301. The anchor pattern may be expressed as a regular expression, for example, and therefore may be of variable length.

Figure 4:
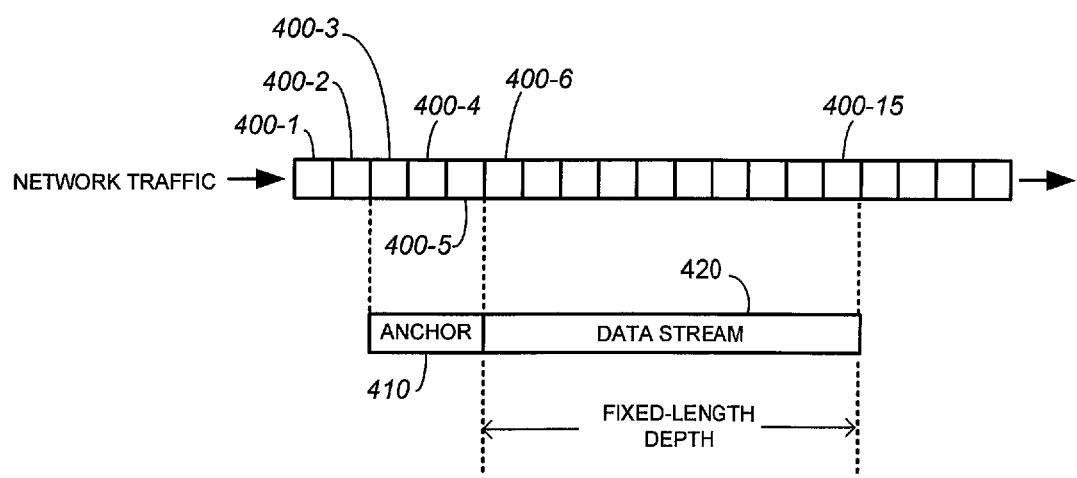
FIG. 4 graphically illustrates feature identification using an anchor pattern and fixed-length data stream in accordance with an embodiment of the present invention.

FIG. 4 graphically illustrates feature identification using an anchor pattern and a fixed-length data stream in accordance with an embodiment of the present invention. In the example of FIG. 4, the network traffic is divided into data units 400 (i.e., 400-1, 400-2, etc.) that arrive from left to right. In one embodiment, a data unit 400 is a byte of data. The length of the anchor pattern 410 and of the fixed-length data stream 420 shown in FIG. 4 are for illustration purposes only. Furthermore, in the example of FIG. 4, the data stream 420 is zero offset from the anchor pattern 410, but may also be one or more units 400 away from the anchor pattern 410.

In one embodiment, once data that match an anchor pattern 410 are identified in the network traffic, the fixed-length data stream 420 immediately following (i.e., zero offset in the example) the data that match the anchor pattern is extracted from the network traffic. Features are then identified from the fixed-length data stream 420. In the example of FIG. 4, the data units 400-3 to 400-5 are found to match the anchor pattern 410. Accordingly, the data units 400-6 to 400-15 are extracted (fixed length of 10 bytes) from the network traffic; features are identified in the data units 400-6 to 400-15.

The features of interest depend on the malware to be detected. For the example exploit kit that works in conjunction with a landing page, the features may comprise statistics (e.g., counts) of elements that may be found within a web page, such as:
 (a) Words, where a word is an alphanumeric string delimited by other characters (e.g. punctuation, whitespace);
 (b) Non-linguistic bigrams;
 (c) Linguistic bigrams, same case;
 (d) Class I: digits [0-9];
 (e) Class II: hex digit characters [a-f], [A-F], [0-9];
 (f) Class III: upper case characters [A-Z];
 (g) Class IV: lower case characters [a-z];
 (h) Class V: punctuation characters;
 (i) Class VI: whitespace characters;
 (j) Class VII: non-printable characters;
 (k) (49) Class transitions, from Class I to Class I through Class VII to Class VII.

The anchor pattern for collecting a fixed-length data stream in which the above features may be identified may be a regular expression that describes a particular hypertext markup language (HTML) tag, e.g., "<html>". In general, for the above features, alphabetic character pairs may be assessed on their likelihood of appearing in Indo-European or Finno-Ugric languages. Bigrams that are not likely to appear in words from these languages are considered non-linguistic bigrams. While these sometimes occur in concatenations, e.g. for variable names, enough occurrences indicate a string that is either randomly generated or is indicative of some data encoding. Conversely, sufficient occurrences of character pairs in the same case that are from the complement of the non-linguistic character set indicate a natural language string. These are useful features in determining whether an element is expressing language, data, or obfuscated data.

The class transition features are used to classify the types of character pairs in the data. For example, "Ab" would increment the count for both the Class II to Class II feature (hex to hex) and the Class III to Class IV feature (upper case to lower case). With only 59 features, one for word-shaped strings, two for linguistic and non-linguistic character pairs, seven for character classes, and 49 for character class pairs, there is sufficient statistical difference between benign and malicious samples for building classifiers, i.e., a machine learning model 241.

As a particular example, suppose the supported features are only uppercase, lowercase, and punctuation. With an anchor pattern of "foo(bar|baz)", a fixed-length depth of 10 bytes, and a data stream comprising "asdfJKL;foobazASDFJKL;asfjkl;ASDF", the following features may be identified:
 (a) Uppercase—7;
 (b) Lowercase—2;
 (c) Punctuation—1;
because the features are only collected at the subsequence "ASDFJKL;as" (which is a fixed-length data stream of 10 bytes from the data "foobaz" that match the anchor pattern "foo(bar|baz)"). The model coefficient for the feature of seven uppercase characters, the model coefficient for the feature of two lowercase characters, and the model coefficient for the feature of one punctuation are summed, and the sum may be compared to a bias to classify the network traffic.

In an example where counts of class transitions are also features, for the same anchor pattern of "foo(bar|baz)", fixed-length depth of 10 bytes, and data stream comprising "asdfJKL;foobazASDFJKL;asfjkl;ASDF", the following features may also be identified:
 (a) Upper→Upper—6;
 (b) Upper→Punct—1;
 (c) Punct→Lower—1;
 (d) Lower→Lower—1.
More particularly, there are six uppercase to uppercase transitions, one uppercase to punctuation transition, one punctuation to lowercase transition, and one lowercase to lowercase transition in the fixed-length data stream. The model coefficients that correspond to the features may be summed along with those of other identified features to classify the network traffic, in the case where a linear model is used.

The same features are chosen for both the training phase and the application phase. During the training phase, fixed-length data streams following chosen anchor patterns are collected. Features are identified from the fixed-length data streams. Each feature is labeled to correspond to the sample, i.e., a feature from a benign sample is labeled as benign and a feature from a malicious sample is labeled as malicious.

The machine learning model 241 is generated by training with the labeled benign and malicious samples.

During the application phase, when the machine learning model 241 (which is a linear model in this example) is deployed in the IPS 210, the IPS 210 scans live network traffic for data that match the anchor pattern. Upon detection of the anchor pattern in the network traffic, the IPS 210 extracts from the network traffic a fixed-length data stream that immediately follows the data that matches the detected anchor pattern. The IPS 210 identifies model features, i.e., features of the machine learning model 241, from the extracted fixed-length data stream, and sums the model coefficients that correspond to the identified model features. The sum of the model coefficients may be compared to a bias to determine a classification of the network traffic. The bias may be selected depending on the particular malware being detected. For example, if the sum is greater than or equal to the bias, the network traffic may be deemed to be malicious. Otherwise, when the sum is less than the bias, the network traffic may be deemed to be benign, or at least not generated by the particular malware the machine learning model 241 was trained to detect.

Figure 5:
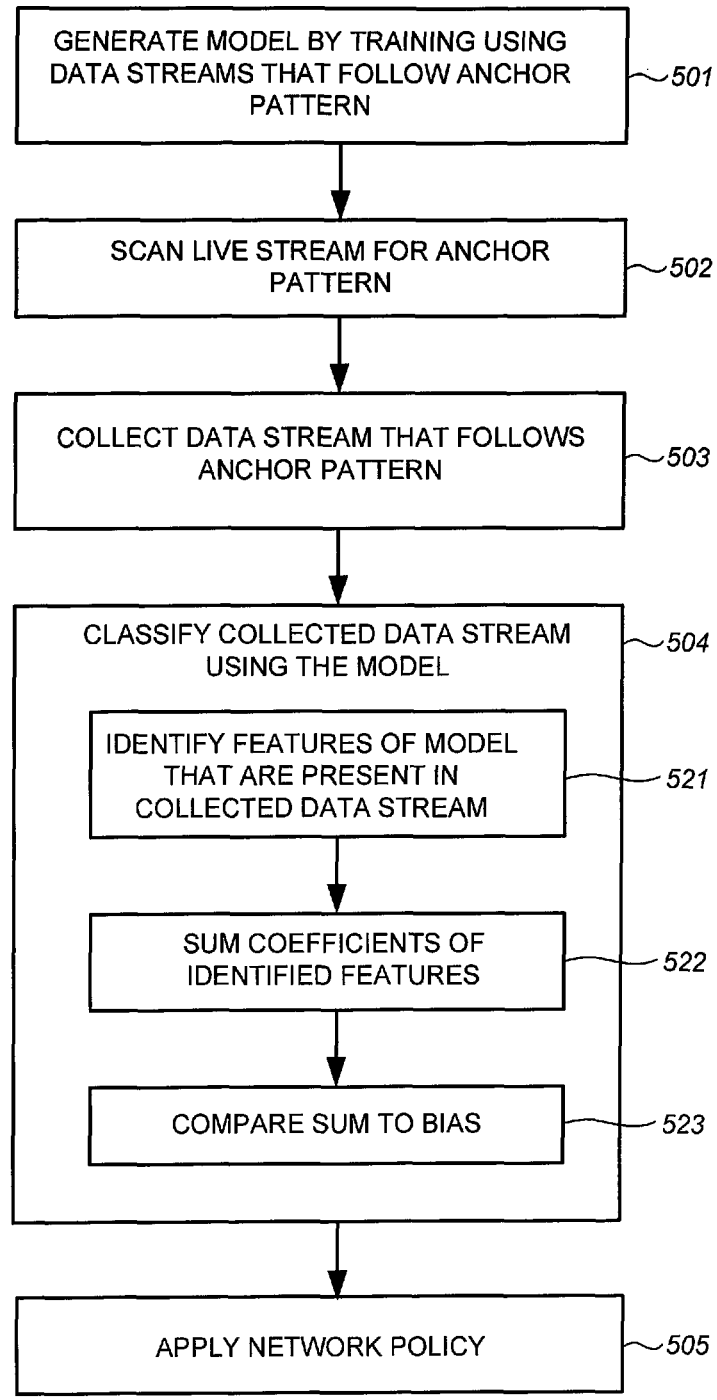
FIG. 5 shows a flow diagram of a computer-implemented method of inspecting network traffic in accordance with an embodiment of the present invention.

FIG. 5 shows a flow diagram of a computer-implemented method of inspecting network traffic in accordance with an embodiment of the present invention. The method of FIG. 5 may be performed by a backend system (e.g., a backend system 240) to generate a machine learning model (e.g., machine learning model 241) and by a network security device (e.g., IPS 210) that uses the machine learning model to inspect network traffic in real-time. Step 501 constitutes a training phase of the machine learning model performed in the backend system, and steps 502-505 constitute an application phase of the machine learning model performed in the network security device.

In the following example, a single machine learning model is generated for clarity of illustration. In practice, several machine learning models are generated to detect particular malware or malware techniques. Each of the machine learning models are trained using benign and malicious samples of the malware or malware technique being detected. During the application phase, a network security device, such as intrusion prevention system, scans network traffic in real-time in accordance with the machine learning models.

In the example of FIG. 5, a machine learning model in the form of a linear model is generated by a backend system by machine learning using samples of benign and malicious data (step 501). Each of the samples of benign and malicious data, which serve as training data sets, may comprise a fixed-length data stream that follows an anchor pattern. As an example, the fixed-length data stream may immediately follow the anchor pattern. The anchor pattern may comprise a regular expression. The fixed-length data streams are labeled accordingly for training, i.e., a fixed-length data stream from a sample of malicious data is labeled as malicious and a fixed-length data stream from a sample of benign data is labeled as benign. Model features are selected and identified from the fixed-length data streams and are used to train and generate the linear model, which comprises model features and corresponding model coefficients. The model features may comprise statistics of particular data within the fixed-length data stream. In one embodiment, a model feature may be a count of uppercase characters, lowercase characters, transitions from an uppercase character to a lowercase character, etc. The machine learning model and corresponding anchor patterns are thereafter provided to the network security device.

The network security device receives and scans network traffic for malware. More particularly, the network security device scans a live stream, i.e., network traffic as it enters the network, for anchor patterns (step 502). When the network security device identifies data in the network traffic that match an anchor pattern, a fixed-length data stream that follows the anchor pattern is extracted by the network security device from the network traffic (step 503). The network security device classifies the fixed-length data stream using the machine learning model (step 504). The network security device applies a network policy on the network traffic depending on the classification of the fixed-length data stream (step 505); the classification of the fixed-length data stream may be assigned to the network traffic. For example, the network security device may block the network traffic when the linear model indicates that the fixed-length data stream, and thus the network traffic, is malicious. Otherwise, the network security device may allow the network traffic to enter the network or network segment being protected by the network security device. Blocking the network traffic includes quarantining the network traffic, preventing the network traffic from propagating in the computer network, preventing the network traffic from being received by a computer in the computer network, or other ways of stopping the network traffic from harming the computer network. Additionally, the network security device may log the occurrence of the identified traffic independent of any determination to apply network policy to the network traffic. For example, the network traffic may be blocked and not logged, blocked and logged, permitted and not logged, or permitted and logged according to the network policy.

In one embodiment, the fixed-length data stream is classified using the machine learning model based on statistics of the fixed-length data stream. More particularly, the fixed-length data stream may be examined for features of the machine learning model, which is the linear model in this example (step 521). The model features may comprise statistics that are indicative of malware, such as counts of presence of particular characters, words, punctuations, etc. in the fixed-length data stream. The linear model may include model coefficients (i.e., weights) that correspond to model features. The model coefficients are applied to the corresponding features that are identified to be present in the fixed-length data stream. For example, in the case of a linear model, the coefficients of identified model features may be summed (step 522). The sum may be compared to a bias to determine the classification of the fixed-length stream, and thus of the network traffic (step 523).

Systems and methods for inspecting network traffic for malware have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of inspecting network traffic of a computer network, the method comprising:
   scanning network traffic for data that match a pattern;
   in response to identifying the data that match the pattern, extracting from the network traffic a fixed-length data stream that follows the data that match the pattern, wherein the fixed-length data stream has a predetermined fixed-length and starts at a predetermined offset from the data that match the pattern;
   identifying model features of a machine learning model that are present in the fixed-length data stream;

classifying the network traffic based at least on model features of the machine learning model that are present in the fixed-length data stream; and applying a network policy to the network traffic when the classification indicates that the network traffic is malicious.

2. The method of claim 1, wherein the pattern comprises a regular expression.

3. The method of claim 1, wherein the model features of the machine learning model comprise statistics of the fixed-length data stream.

4. The method of claim 3, wherein the statistics comprises a count of a number of characters in the fixed-length data stream.

5. The method of claim 3, wherein the statistics comprises a count of a number of uppercase characters and a count of lowercase characters in the fixed-length data stream.

6. The method of claim 3, wherein the pattern describes a hypertext markup language (HTML) tag.

7. The method of claim 6, wherein the statistics comprises a count of a web page element in the fixed-length data stream.

8. The method of claim 1, wherein the machine learning model is a linear model.

9. The method of claim 1, wherein the fixed-length data stream starts at zero offset from the data that match the pattern.

10. A system for inspecting network traffic of a computer network, the system comprising:

a backend system that is configured to generate a machine learning model; and an intrusion prevention system operating in a computer network, the intrusion prevention system being configured to receive the machine learning model, inspect network traffic entering the computer network, identify data in the network traffic that match a pattern, extract from the network traffic a fixed-length data stream that immediately follows the data that match the pattern, identify in the fixed-length data stream model features of the machine learning model, perform a summation of model coefficients of the machine learning model that correspond to the model features of the machine learning model that are present in the fixed-length data stream, and apply a network policy to the network traffic when the summation of the model coefficients indicates that the network traffic comprises malicious data, wherein the fixed-length data stream has a predetermined fixed-length.

11. The system of claim 10, wherein the pattern comprises a regular expression.

12. The system of claim 10, wherein the machine learning model is a linear model.

13. The system of claim 10, wherein the model features of the machine learning model comprise statistics of the fixed-length data stream.

14. The system of claim 13, wherein the pattern describes a hypertext markup language (HTML) tag.

15. The system of claim 14, wherein the statistics comprises a count of a web page element in the fixed-length data stream.

16. A non-transitory computer-readable medium comprising instructions stored thereon, that when executed by a processor, perform the steps of:

scanning network traffic for data that match a pattern;

in response to identifying the data that match the pattern, extracting from the network traffic a fixed-length data stream that immediately follows the data that match the pattern, wherein the fixed-length data stream has a predetermined fixed-length;

identifying model features of a machine learning model that are present in the fixed-length data stream;

performing a summation of model coefficients of the machine learning model that correspond to the identified model features of the machine learning model that are present in the fixed-length data stream; and preventing the network traffic from propagating into the computer network when the summation of the model coefficients indicates that the network traffic is malicious.

17. The non-transitory computer-readable medium of claim 16, wherein the pattern comprises a regular expression.

18. The non-transitory computer-readable medium of claim 16, wherein the model features of the machine learning model comprise statistics of the fixed-length data stream.

19. The non-transitory computer-readable medium of claim 18, wherein the pattern identifies a hypertext markup language (HTML) tag and the statistics comprises a count of a web page element in the fixed-length data stream.

20. The non-transitory computer-readable medium of claim 16, wherein the machine learning model comprises a linear model.

* * * * *